United States Patent
Nadgauda et al.

(10) Patent No.: US 6,901,122 B2
(45) Date of Patent: May 31, 2005

(54) METHOD AND APPARATUS FOR RESTORING A SOFT DECISION COMPONENT OF A SIGNAL

(75) Inventors: Nikhil S. Nadgauda, Hoboken, NJ (US); Kevin L. Baum, Rolling Meadows, IL (US); Frederick W. Vook, Schaumburg, IL (US)

(73) Assignee: Motorola, Schaumburg, IL (US)

( * ) Notice: Subject to any disclaimer, the term of this patent is extended or adjusted under 35 U.S.C. 154(b) by 805 days.

(21) Appl. No.: 09/818,767

(22) Filed: Mar. 27, 2001

(65) Prior Publication Data

US 2002/0177427 A1 Nov. 28, 2002

(51) Int. Cl.⁷ .............................. H04B 7/10; H04L 1/02
(52) U.S. Cl. ...................... 375/347; 375/267; 375/349; 375/285; 455/137; 455/132
(58) Field of Search ................................ 375/267, 349, 375/346, 347, 278, 284, 285, 394; 455/137, 132

(56) References Cited

U.S. PATENT DOCUMENTS

| | | | | |
|---|---|---|---|---|
| 6,141,393 A | * | 10/2000 | Thomas et al. | 375/347 |
| 6,362,781 B1 | * | 3/2002 | Thomas et al. | 342/383 |
| 6,418,175 B1 | * | 7/2002 | Pukkila et al. | 375/347 |
| 6,445,342 B1 | * | 9/2002 | Thomas et al. | 342/367 |
| 6,504,506 B1 | * | 1/2003 | Thomas et al. | 342/383 |
| 6,647,078 B1 | * | 11/2003 | Thomas et al. | 375/349 |

* cited by examiner

Primary Examiner—Phuong Phu
(74) Attorney, Agent, or Firm—Kenneth A. Haas (57) ABSTRACT

A method includes the steps of receiving (402), by a first receiver (102), a first received signal comprising a first signal (110) and a second signal (120), and receiving (402), by a second receiver (104), a second received signal comprising the first signal (110) and the second signal (120). A branch weight associated with the first receiver (102) and at least one other branch weight associated with the second receiver (104) are determined (406). The branch weight associated with the first receiver (102), the at least one other branch weight associated with the second receiver (102), the first received signal, and the second received signal are combined, forming a combined signal. Channel state information is determined for the combined signal, and the channel state information of the combined signal is restored (412).

33 Claims, 2 Drawing Sheets

METHOD AND APPARATUS FOR RESTORING A SOFT DECISION COMPONENT OF A SIGNAL

FIELD OF THE INVENTION

The present invention relates generally to signal diversity combining in communication systems including, but not limited to, soft decision diversity signal combining techniques.

BACKGROUND OF THE INVENTION

An adaptive antenna array is an array of antennas connected to a communication receiver, which operates by combining the signals received by the antennas in order to optimize, in an adaptive fashion, the receive characteristics of the array. By weighting and then summing the multiple antenna signals, the adaptive antenna array adapts its angular response, sometimes called the array pattern, in response to changes in the propagation environment. While operating, the adaptive antenna attempts to maximize the reception of the signal received from a desired transmitting device, while simultaneously minimizing the effects of unwanted interfering signals and noise. In a communication system, the interference suppression capability of an adaptive antenna array offers the potential to reduce co-channel interference, improve coverage quality, and increase overall system capacity.

In a communication system, it is known in the art for a transmitter to transmit training sequences, also known as pilot codes or pilot symbols, to a receiver. The receiving device has prior knowledge of the nature of the transmitted training sequence and uses the received training sequence to perform tasks such as carrier recovery, channel estimation, and other related tasks that are known in the art for maintaining a high-quality communication link. In order to exploit the allocated spectrum most efficiently, it would be advantageous to minimize the percentage of the transmitted symbols that are pilot symbols.

When used with very short training sequences, however, conventional diversity combining techniques, also known as adaptive array combining techniques, suffer a performance degradation due to degraded covariance and channel gain estimates. Short training sequences often do not provide enough processing gain to adequately suppress any interference present in the channel measurements used to form these estimates. Generally, the sample matrix inversion (SMI) algorithm, which is a known method for calculating the branch combining weights of an adaptive array, requires a training sequence length of two times the number of antenna elements to achieve an average signal-to-interference plus noise ratio (SINR) within 3 dB of the theoretically optimal level. Lengthening of the training sequence allows for more accurate signal decoding, but results in lower data throughput because of higher overhead.

Another problem that exists with conventional diversity combining techniques is the loss of channel state information in a soft decision output signal. Many communication systems employ forward error correction coding to reduce the bit error rate of the transmitted information. Soft decision decoding of such codes is known in the art to be superior to hard decision decoding. In fading channels, however, conventional diversity combining techniques distort the channel state information in the soft decision output, which leads to an increase in the bit error rate at the output of the decoder. The distortion is caused by typical minimum-mean-square-error (MMSE) diversity combining algorithms attempting to minimize the mean-square error between the array output and a known training or reference sequence stored in the receiver. As a result, the diversity combining algorithm automatically scales the array output signal to have amplitude characteristics similar to the stored training sequence even when the array input signals are in a deep fade. Thus, the amplitude characteristics of the array output signals do not reflect the actual channel state information of the combined signal, leading to degraded performance in the soft-decision decoder.

Accordingly, there is a need for an apparatus and method that utilizes a short training sequence and restores the soft decision channel state information.

DESCRIPTION OF A PREFERRED EMBODIMENT

The present invention provides for the use of short training sequences for determining the branch combining weights of an adaptive array, while providing that the channel state information of the combined signal at the array output is estimated and restored prior to soft-decision decoding.

A method of the present invention comprises the steps of receiving, by a first receiver, a first received signal comprising a first signal and a second signal, and receiving, by a second receiver, a second received signal comprising the first signal and the second signal. A branch weight associated with the first receiver and at least one other branch weight associated with the second receiver are determined. The branch weight associated with the first receiver, the at least one other branch weight associated with the second receiver, the first received signal, and the second received signal are combined, forming a combined signal. Channel state information is determined for the combined signal, and the channel state information of the combined signal is restored.

The method may include any of the following. The step of combining may comprise the steps of applying the branch weight associated with the first receiver to the first received signal, forming a first weighted branch signal, applying the branch weight associated with the second receiver to the second received signal, forming a second weighted branch signal, and combining the first weighted branch signal and the second weighted branch signal to form a combined signal. The steps of determining channel state information and restoring may comprise the steps of determining a mean square error estimate for the combined signal and applying a function of the mean square error estimate to the combined signal. The step of applying the function of the mean square error estimate may comprise dividing the combined signal by the mean square error estimate. The step of restoring may comprise outputting the combined signal and the channel state information as separate quantities. The first receiver may be a branch receiver and the second receiver may be a branch receiver. The first signal may be transmitted by a first transmitter and the second signal may be transmitted by a second transmitter. The step of determining may further comprise the step of determining at least one channel response for the first signal and at least one channel response for the second signal, and the channel responses may be complex channel gains. The first signal may comprise at least two different instances of a predetermined sequence, further comprising the step of determining variations in channel response between the different instances of the predetermined sequence. The method may further comprise the step of identifying a predetermined sequence within the first signal and/or the second signal, which predetermined sequence may comprise a pilot code or a training sequence or pilot symbols. Pilot code from at least one of the first signal and the second signal may be utilized to determine the at least one branch weight associated with the first receiver and the at least one branch weight associated with the second receiver. The signals may be time division multiple access (TDMA), code-division multiple access (CDMA), frequency division multiple access (FDMA), time division multiplexed (TDM), code division multiplexed (CDM), or orthogonal frequency division multiplexed (OFDM) encoded signals, a combination of these formats, or other digital transmission format(s) known in the art. The method steps may be implemented as computer readable program code within a computer-readable signal bearing medium.

Channel state information conveys additional information about the reliability of an output signal and may enhance the performance of a channel decoder. One example of a channel decoder is a Viterbi decoder for data that has been convolutionally encoded with a forward error correction code prior to transmission. Some examples of channel state information are signal to noise ratio of an output signal, channel gain to noise-plus-interference-power ratio, signal-to-distortion ratio, or simply the channel gain when the noise power and other interference/distortion power is expected to be nearly constant. In the preferred embodiment of the present invention, a function of the mean square error estimate of the combined signal is considered a form of channel state information.

Figure 1:
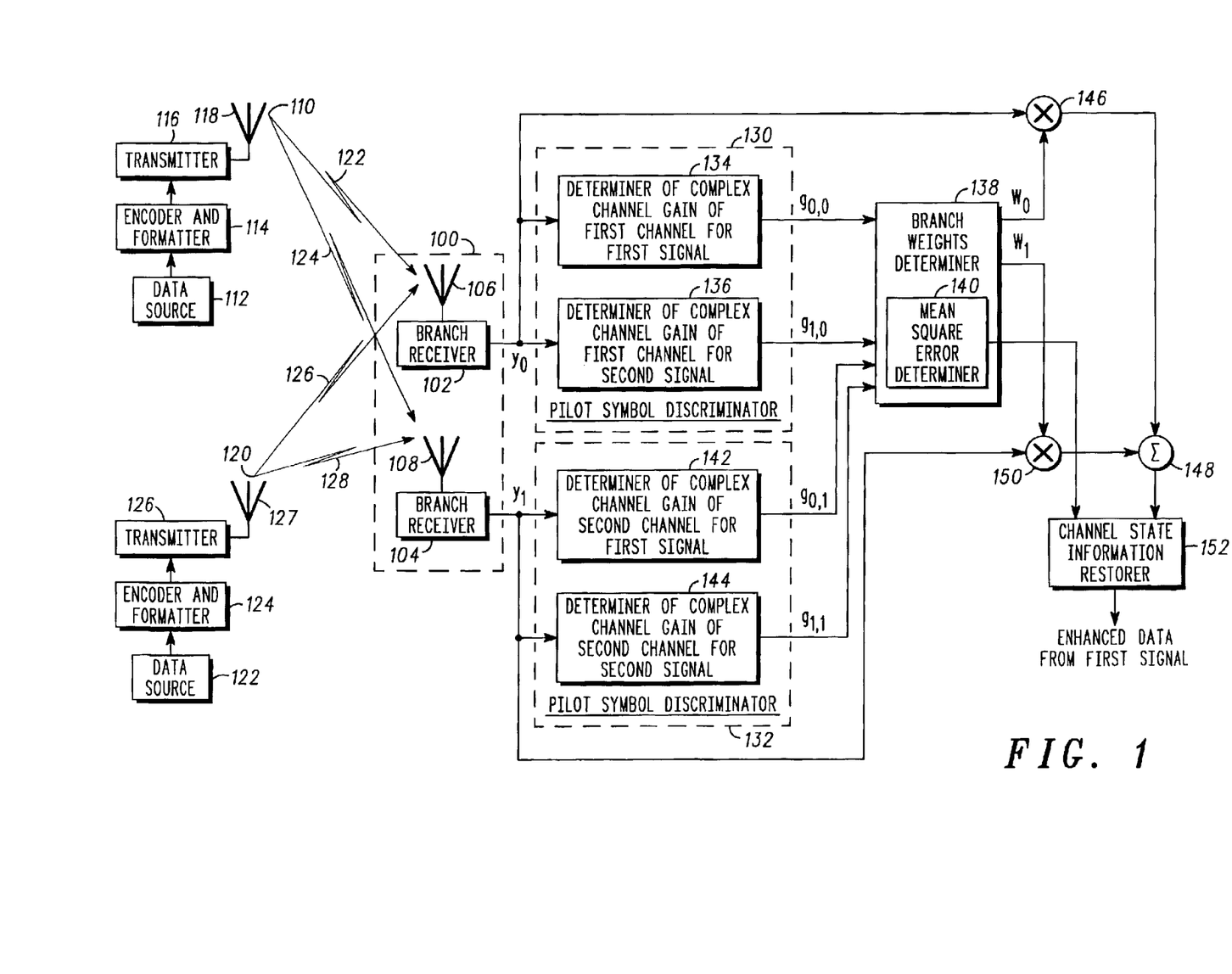
FIG. 1 is a block diagram of a communication system comprising a multiple-branch digital communications receiver in accordance with the invention.

A block diagram of a communication system comprising a multiple-branch digital communications receiver is shown in FIG. 1. The communication system may be a cellular communication system, a two-way radio communication system, or other type of wireless communication system. Although the invention is described in a wireless embodiment, the invention is not limited to wireless applications. A receiving unit 100 is a multiple-branch receiver, also known as a receive antenna array, that has two branch receivers: a first branch receiver 102 connected to a first antenna 106 and a second branch receiver 104 connected to a second antenna 108. Although only two branch receivers are shown, the present invention may be applied to more than two branch receivers, or in array terminology, to a receive array with more than two elements. Likewise, the branch receivers 102 and 104 may be located in separate receiving units.

A first signal 110 is constructed from a first data source 112, processed by a first encoder and formatter 114, and transmitted by a first transmitter 116 through its antenna 118. A second signal 120 is constructed from a second data source 122, processed by a second encoder and formatter 124, and transmitted by a second transmitter 126 through its antenna 127. These two transmitter devices 112, 114, 116, and 118 and 122, 124, 126, and 127 may be part of a single communication device, such as a base transmitter or transceiver, or may be part of two different communication devices. Signals that are transmitted by the transmitters 116 and 126 include single carrier signals, as shown and described with respect to FIG. 2, or OFDM signals, as shown and described with respect to FIG. 3, or other type of signals that are known in the art.

Figures 2, 3:
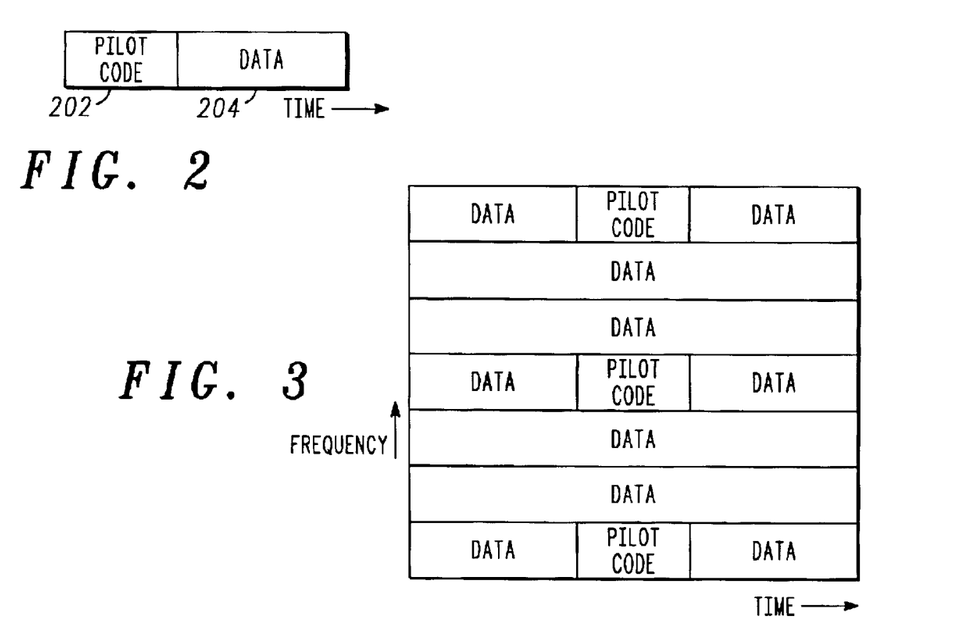
FIG. 2 is a diagram showing an exemplary single carrier slot or burst format in accordance with the invention.
FIG. 3 is a diagram showing an exemplary orthogonal frequency division multiplexed (OFDM) slot or burst format in accordance with the invention.

A diagram showing an exemplary single carrier slot or burst format is shown in FIG. 2. The single carrier slot may comprise a pilot code 202 and data 204. In the preferred embodiment, each burst or slot contains one or more instances of pilot code 202, also known as pilot symbols or training sequence. The pilot code 202 is typically a predetermined or known sequence of data, such as symbols or bits. The number of symbols in the pilot code is preferably at least as large as the number of significant co-channel signals being received by the receiving unit 100. When P co-channel interfering co-channel signals are considered to be significant, the number of significant co-channel signals is P+1, because the receiver receives the desired signal from its own cell and the P significant co-channel interfering signals from surrounding cells. Each significant co-channel signal is assigned a different pilot code and the different pilot codes are selected to be mutually orthogonal in the preferred embodiment, although other implementations may also be successful. The data 204 may include voice, video, coded information, error correction information, and so forth.

An exemplary time-frequency slot format for an orthogonal frequency division multiplexed (OFDM) signal format is shown in FIG. 3. With OFDM, multiple subcarrier frequencies occur during each symbol period, such that the data symbols and pilot symbols can be organized into a two-dimensional (time and frequency) slot format. In FIG. 3, pilot symbols form pilot codes on selected subcarriers, and are placed near the center of the time duration of the slot in the preferred embodiment. In alternate OFDM slot formats, the slot length or the number of subcarriers may be changed, and a pilot code may be configured to span multiple subcarriers or a combination of multiple-symbol periods and multiple subcarriers.

With respect to FIG. 2 and FIG. 3, alternative embodiments may have slots/bursts without a pilot code if the channel changes slowly, or if interpolation/filtering is used to track channel variations between the transmissions of pilot codes.

The first transmitted signal 110, comprised of pilot code and data, propagates from the first transmitter antenna 146 to the antenna 106 of the first branch receiver 102 over a first communication channel 122 and propagates from the first transmitter antenna 146 to the antenna 108 of the second branch receiver 104 over a second communication channel 124. The second transmitted signal 120, comprised of pilot code and/or data, propagates from the second transmitter antenna 156 to the antenna 106 of the first branch receiver 102 over a third communication channel 126 and propagates from the second transmitter antenna 156 to the antenna 108 of the second branch receiver 104 over a fourth communication channel 128. The communication channels 122, 124, 126, and 128 are called out individually because the channel response, which may be, for example, the channel gain, between a transmitter and a receiver is dependent on the physical locations of the transmitter antenna and the receiver antenna, antenna polarization, and the propagation environment, among other factors. Therefore, the characteristics of the communication channel, such as the channel response, may be different for different pairs of transmit/receive antennas, although the same transmit/receive frequencies may be utilized. Thus, although the same signal is transmitted to two different receivers, the signal as received is likely to be different at each different receiver.

In accordance with one aspect of the invention, both transmitters 116 and 126 may transmit simultaneously, such that branch receiver 102 receives a first received signal, which is a combination of the first transmitted signal 110 after passing through the first communication channel 122 and the second transmitted signal 120 after passing through the third communication channel 126. Likewise, branch receiver 104 receives a second received signal, which is a combination of the first transmitted signal 110 after passing through the second communication channel 124 and the second transmitted signal 120 after passing through the fourth communication channel 128. The received signals are shown in the drawings as the combination of receiving two signals for the sake of simplicity, although the present invention may be applied to one or more signals received at a branch receiver.

Each receiver 102 and 104 is also coupled to a pilot symbol discriminator 130 or 132, respectively. The pilot symbol discriminators identify pilot codes within the received signals and determine the complex channel gains of the channels 122, 124, 126, and 128, for example, by estimating. Although the pilot symbol discriminators 130 and 132 are shown as separate blocks, they may be implemented in a single pilot symbol discriminator.

The first pilot symbol discriminator 130 contains blocks 134 and 136 that determine a set of complex channel gains. The first block 134 determines or identifies the complex channel gain $g_{0,0}$ of a first channel 122 of the first signal 110. The second block 136 determines or identifies the complex channel gain $g_{1,0}$ of a first channel 126 of the second signal 120. The output of the blocks 134 and 136 are coupled to a branch weights determiner 138 that determines the branch weights, also known as antenna coefficients, for combining the two received signals so that one of the signals 110 or 120 is enhanced while the other is suppressed. The output of the blocks 134 and 136 are also available to a mean square error determiner 140.

Similarly, the second pilot symbol discriminator 132 contains blocks 142 and 144 for determining another set of complex channel gains. The first block 142 determines or identifies the complex channel gain $g_{0,1}$ of the second channel 124 for the first signal 110. The second block 144 determines or identifies the complex channel gain $g_{1,1}$ of the second channel 128 of the second signal 120. The outputs of the blocks 142 and 144 are input to the branch weights determiner 138 and are available to the mean square error determiner 140.

Pilot symbol discriminators 130 and 132 may optionally determine or estimate any variations in the values of the complex channel gains between pilot codes received at different times, or in the case where an OFDM signal is received, the variations in the complex channel gains between pilot codes received at different times and/or on different sub-carriers. This process may use standard interpolation/filtering techniques known in the art. In this case, the branch weights determiner 138 computes new branch weights at predetermined points in time (and/or frequency for an OFDM signal) between pilot codes in different bursts or slots, thereby enhancing performance in dynamic channels.

A multiplier 146 is coupled to an output of the branch weights determiner 138 and the branch receiver 102. The output of the multiplier 146 is coupled to a signal combiner 148. Another multiplier 150 is coupled to an output of the branch weights determiner 138 and the branch receiver 104. The output of the multiplier 130 is coupled to the signal combiner 148. The multipliers 146 and 150 multiply their inputs together to provide an output signal. The outputs of the branch receivers 102 and 104 are typically complex numbers representing the complex baseband format of the signals, as is known in the art. The branch weights are also typically complex numbers that may alter both the amplitude and the phase of the signals to which they are applied. In the preferred embodiment, the signal combiner 148 adds the signals at its inputs to provide an output to a channel state information (CSI) restorer 152.

The mean square error determiner 140, which estimates the mean square error (MSE) of the combined signal, receives the outputs of the pilot symbol discriminators 130 and 132 and outputs its results to the channel state information restorer 152. The output of the mean square error determiner 140 is referred to as a mean square error "estimate" because the error signal is a random variable, and the process of measuring or determining a statistical property of a random variable in a receiver is commonly called estimation. In the preferred embodiment, the channel state information restorer 152 applies a function of the estimated MSE to the output of the signal combiner 148 in order to restore the CSI of the combined signal. Exemplary embodiments of the CSI restorer include multiplying the combined signal by 1/MSE or multiplying the combined signal by (1−MSE)/MSE, where MSE is the MSE estimate, as will be described later. In an alternate embodiment, if a decoder connected to the present invention requires the channel state information to be separate from the combined signal, the combined signal and the function of the estimated MSE, such as 1/MSE or (1−MSE)/MSE, may be gathered as an ordered pair and passed to the decoder. The channel state information restorer 152 outputs enhanced data from the first signal, which enhanced data is available for use by an apparatus that performs soft decision decoding.

In the example of FIG. 1, the number of branch receivers is the same as the number of significant co-channel signals. The invention is also suitable in cases where the number of branch receivers is greater than or less than the number of significant co-channel signals. Generally, as is known in the art, the performance of a multiple branch receiver improves as the number of branches is increased.

Figure 4:
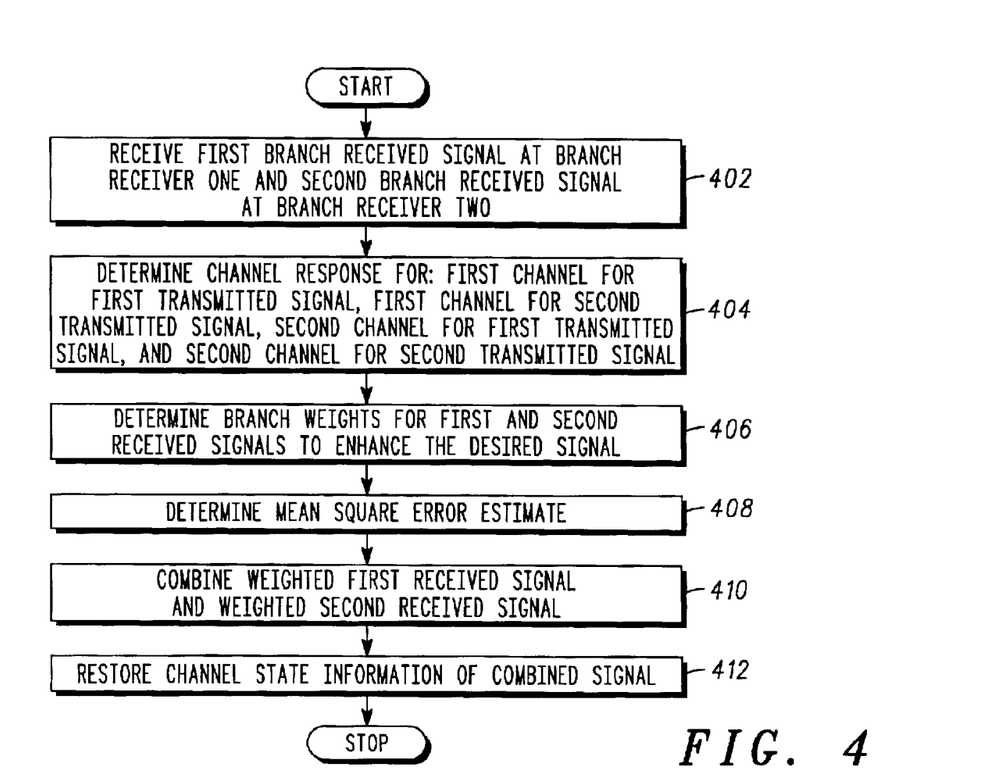
FIG. 4 is a flowchart showing a method of weighting and combining branch signals in accordance with the invention.

A flowchart of the steps for burst mode soft decision diversity signal combining is shown in FIG. 4. At step 402, a first received signal, which is a combination of the first transmitted signal 110 after passing through one communication channel 122 and the second transmitted signal 120 after passing through another communication channel 126, is received by the first branch receiver 102, and is provided at that branch receiver's output, preferably in complex baseband form. Also at step 402, a second received signal is received at the second branch receiver 104, where the second received signal is a combination of the first transmitted signal 110 after passing through one communication channel 124 and the second transmitted signal 120 after passing through another communication channel 128. The second received signal is provided at the output of the second branch receiver 104, preferably in complex baseband form.

At step 404, the channel responses in the form of a complex channel gain of the first channel 122 for the first transmitted signal 110, a complex channel gain of the first channel 126 for the second transmitted signal 120, a complex channel gain of the second channel 124 for the first transmitted signal 110, and a complex channel gain of the second channel 128 for the second transmitted signal 120 are determined via the pilot symbol discriminator 130 and 132 as follows, where in one embodiment, the first transmitted signal 110 is a desired signal and the second transmitted signal 120 is an undesired co-channel interfering signal, although in other embodiments the second signal 120 may be a second desired signal.

By using distinct pilot sequences, such as Walsh-coded orthogonal pilot sequences, a reliable estimation of the desired signal's channel and interfering signal's channel is achieved. There are several possible channel estimation methods, but in the preferred embodiment, the following channel estimation method may be used on each branch receiver and for each significant co-channel signal:

$$g = \sum_{n=0}^{N-1} \frac{P_n^*}{|P_n|^2} \hat{P}_n$$

where g is the estimated complex channel gain or channel estimate, N is the number of pilot symbols used in the process or the pilot code length, $P_n$ is the nth symbol of the known, stored pilot code for the transmitted signal whose complex channel gain is being estimated, and $\hat{P}_n$ is the received signal at the position where the nth symbol of the pilot code is located in the received signal. The following equation is a model of the received signals on the multiple branch receivers at a particular time, in vector form:

$$\underline{y} = \begin{bmatrix} g_{0,0} \\ g_{0,1} \\ \vdots \\ g_{0,M-1} \end{bmatrix} x_0 + \begin{bmatrix} g_{1,0} \\ g_{1,1} \\ \vdots \\ g_{1,M-1} \end{bmatrix} x_1 + \cdots + \begin{bmatrix} g_{K-1,0} \\ g_{K-1,1} \\ \vdots \\ g_{K-1,M-1} \end{bmatrix} x_{K-1} + \begin{bmatrix} n_0 \\ n_1 \\ \vdots \\ n_{M-1} \end{bmatrix} = \sum_{k=0}^{K-1} \underline{g}_k X_k + \underline{n}$$

In the above equation, $\underline{y}$ represents the received symbol vector, which is constructed by collecting each branch receiver output at a particular symbol location into a vector. In the embodiment of FIG. 1., there are 2 branch receivers, thus M=2, and two significant co-channel signals, thus K=2. $x_k$ represents the data symbol originating from transmitter k, $n_m$ represents the white gaussian random noise affecting the mth branch receiver, such as branch receiver 102 or 104, and $g_{k,m}$ represents the complex channel gain multiplying the symbol originating from transmitter k and received by antenna m 106 or 108. The M by 1 vector $g_k$ in the above equation is the channel gain vector for transmitter k and contains the complex channel gains for transmitter k and the M receive antennas. In an alternate embodiment, $n_m$ may include noise as well as other types of distortion or interference, such as co-channel interference, that is not explicitly identified by the pilot symbol discriminator.

At step 406, the branch weights are determined by the branch weights determiner 138 in order to enhance the desired signal (which is the first signal 110 in this example). In the preferred embodiment, the process of determining the branch weights includes the computation of a received symbol covariance matrix and a steering vector by the pilot symbol discriminators 130, 132 and the branch weights determiner 138. The computation of the covariance matrix proceeds as:

$$\Phi = E\{\underline{y}^*\underline{y}^T\}$$

As known in the prior art, the covariance matrix is commonly estimated using a large number of received signal samples. In the present invention, the covariance matrix is estimated directly from the complex channel gain estimates based on the model of $\underline{y}$:

$$\Phi = E\left\{\left(\sum_{i=0}^{K-1} \underline{g}_i^* x_i^* + \underline{n}^*\right)\left(\sum_{j=0}^{K-1} \underline{g}_j^T x_j + \underline{n}^T\right)\right\}, \text{ where } \begin{array}{l} E\{x_i^* x_j\} = 0 \quad \forall\, i \neq j \\ E\{x_i^* \underline{n}\} = \underline{0} \quad \forall\, i \end{array}$$

$$= \sum_{k=0}^{K-1} \underline{g}_k^* \underline{g}_k^T E\{|x_k|^2\} + E\{\underline{n}^*\underline{n}^T\},$$

where the channel gain covariance matrix is given by:

$$\underline{g}_k^* \underline{g}_k^T = \begin{bmatrix} |g_{k,0}|^2 & g_{k,0}^* g_{k,1} & \cdots & g_{k,0}^* g_{k,M-1} \\ g_{k,1}^* g_{k,0} & |g_{k,1}|^2 & & \\ \vdots & & \ddots & \\ g_{k,M-1}^* g_{k,0} & & & |g_{k,M-1}|^2 \end{bmatrix},$$

and the noise covariance matrix is given by:

$$E\{\underline{n}^*\underline{n}^T\} = \begin{bmatrix} \sigma_0^2 & 0 & \cdots & 0 \\ 0 & \sigma_1^2 & & \\ \vdots & & \ddots & \\ 0 & & & \sigma_{M-1}^2 \end{bmatrix}, \text{ where } E\{n_i n_j\} = \begin{cases} \sigma_i^2 & i = j \\ 0 & i \neq j \end{cases}.$$

The direct use of the complex channel gain estimates of the significant co-channel signals eliminates one of the expectation operations from the covariance matrix estimation, leaving the expectation operation only on the stored pilot code and noise terms. Because the receiver has a locally stored copy of the pilot code, the expected symbol power is a known constant and need not be estimated. Moreover, the white noise power on each branch receiver 102 and 104 may be estimated using techniques known in the art, so that all expectation operations may be eliminated. When operating in environments containing interference from transmitters that are unknown to the receiver, the spatial covariance matrix of these transmitters may be estimated or determined by techniques known in the art. In an embodiment of the present invention, the spatial covariance matrix of these transmitters is added into the above equation for the covariance matrix.

As with the received symbol covariance matrix, the steering vector may be constructed without any unknown expectations:

$$s = E\{\underline{y}^* x_d\} = \underline{g}_d^* E\{|x_d|^2\}$$

Because the above equations contain no unknown expectations, both the received symbol covariance matrix and the steering vector may be determined using a short pilot code in place of the long training sequences needed in conventional estimation methods, thereby leading to improved data throughput by reducing the required number of training symbols, and providing for tracking of dynamic channels at symbol positions between pilot codes using the optional interpolation/filtering method described earlier. By using these interpolation/filtering methods, better performance in rapidly changing environments is achieved over prior art methods.

The computation of the branch weights and combined signal is outlined as follows. The branch weights are obtained from:

$$\underline{w} = \Phi^{-1}\underline{s},$$

where the covariance matrix and steering vector are obtained based on the complex channel gain estimates, as described earlier. The combined signal is obtained from:

$$y_c = \underline{w}^T \underline{y},$$

where $y_c$ is the combined signal and where the superscript T denotes the transpose operator. Because the described combining method forces the gain characteristic of the combined signal to be similar to the gain characteristic of the stored pilot code symbols, the invention also modifies the combined signal to restore channel state information for soft decision decoding. The combined signal is modified by a function of an estimated mean square error, denoted as MSE, of the combined signal. In the preferred embodiment, the combined signal is divided by the estimated MSE to restore the soft decision information:

$$y_{c,s} = \frac{y_c}{MSE},$$

where $y_{c,s}$ is the combined signal with restored soft decision channel state information and MSE is the estimated MSE. In an alternate embodiment, the function of the estimated MSE is defined as a multiplication by (1−MSE) and a division by MSE as follows:

$$y_{c,s} = \frac{y_c(1 - MSE)}{MSE}.$$

This alternate function expands the dynamic range of the channel state information and further emphasizes differences in the reliability of the soft decisions that are passed to the decoder.

At step 408, a mean square error estimate is determined. A preferred embodiment for the generation of a mean square error estimate, as determined by the mean square error determiner 140, is described as follows. The mean square error of the combined signal is defined as:

$$MSE = E\{|x_d - (\Phi^{-1}\underline{s})^T \underline{y}|^2\}.$$

In the preferred embodiment, the MSE estimate is obtained using quantities that have already been estimated in determining the branch weights by proceeding as follows:

$$MSE = E\{|x_d - (\Phi^{-1}\underline{s})^T \underline{y}|^2\}$$
$$= E\{(x_d - \underline{s}(\Phi^{-1})^T \underline{y})(x_d^* - \underline{y}^H(\Phi^{-1})^*\underline{s}^*)\}$$
$$= E\{|x_d|^2 - x_d\underline{y}^H(\Phi^{-1})^*\underline{s}^* - \underline{s}^T(\Phi^{-1})^T \underline{y}x_d^* + \underline{s}^T(\Phi^{-1})^T \underline{y}\underline{y}^H(\Phi^{-1})^*\underline{s}^*\}$$
$$= E\{|x_d|^2 - x_d\underline{y}^H(\Phi^{-1})^*\underline{s}^* - \underline{s}^T(\Phi^{-1})^T \underline{y}x_d^* + \underline{s}^T(\Phi^{-1})^T\Phi^*(\Phi^{-1})^*\underline{s}^*\}$$
$$= E\{|x_d|^2 - \underline{s}^T(\Phi^{-1})^*\underline{s}^*\}$$
$$= E\{|x_d|^2 - \underline{s}^H\Phi^{-1}\underline{s}\} \quad \text{Note: } \Phi^{-1} = (\Phi^{-1})^H$$
$$= E\{|x_d|^2\}(1 - E\{|x_d|^2\}\underline{g}_d^T\Phi^{-1}\underline{g}_d^*).$$

With this form, the MSE is estimated using the same covariance matrix and steering vector as was used for computing the branch weights, thus reducing the receiver computational requirements significantly. Also, when the complex channel gains and noise power remain relatively constant for a period of time, the MSE estimate also remains relatively constant, thus computations may be further reduced by updating the MSE estimate only when the complex channel gains have changed significantly.

The above method of computing the estimated MSE assumes the combining weight vector is computed according to a minimum mean square error criteria. In alternative embodiments, other criteria may be used to compute the combining weight vector. For example, a zero-forcing criteria may be used to compute the branch weights. The zero forcing criteria computes the branch weights as follows. Letting M be the number of receive antennas and letting K be the number of transmitters whose channel gain vectors $g_k$ (defined above) are known at the receiver, the channel gain matrix G is defined to be an M by K matrix where the $k^{th}$ column of G is the channel gain vector of transmitter k, $g_k$. The zero forcing criteria is to calculate an M by K weight matrix W such that the transpose of W multiplied by the channel gain matrix produces the K by K identity matrix. The combining weight that receives the signal from transmitter k while suppressing the contributions of the other K−1 co-channel transmitters is the $k^{th}$ column of the weight matrix W.

In alternate embodiments where a criteria other than the minimum mean square error criteria is employed to compute the branch weights, the mean square error, MSE, may differ from the expression in the previous equation. When the combining weight vector w is used to combine the array outputs, the mean square error is shown to be:

$$MSE = E\{|x_d - \underline{w}^T \underline{y}|^2\}$$
$$= E\{(x_d - \underline{w}^T\underline{y})(x_d^* - \underline{y}^H\underline{w}^*)\}$$
$$= E\{|x_d|^2\}(1 - 2\text{Re}\{\underline{w}^T\underline{g}_d\}) + \underline{w}^H\Phi\underline{w},$$

where Re{ } takes the real component of a complex quantity, and Φ is the covariance matrix, which is calculated at the receiver according to the steps outlined above. In another embodiment of the MSE determiner 140, the MSE estimate may be based on processing a decision-directed error signal or a pilot symbol directed error signal over a plurality of symbol intervals.

At step 410, the branch weights from step 406 are applied to their respective received signals, by the signal multipliers 146 and 150, and the weighted first received signal and weighted second received signal are combined by the signal combiner 148.

At step 412, the channel state information of the combined signal is restored, preferably by applying a function of the mean square error estimate determined at step 408, as described earlier. In one embodiment of the present invention, applying a function of the mean square error estimate includes dividing the combined signal by the estimated MSE to restore the soft decision information:

$$y_{c,s} = \frac{y_c}{MSE},$$

where $y_{c,s}$ is the combined signal with restored soft decision channel state information and MSE is the estimated MSE. In an alternate embodiment, applying a function of the MSE is defined as a multiplication by (1−MSE) and a division by MSE as follows:

$$y_{c,s} = \frac{y_c(1-MSE)}{MSE}.$$

This alternate function expands the dynamic range of the channel state information and further emphasizes differences in the reliability of the soft decisions that are passed to the decoder.

In an alternative embodiment of the invention, step 408 may be performed before step 406, and step 412 may be performed within step 406 by noting that the division of the combined signal by the estimated MSE may alternatively be implemented by dividing each branch weight by the estimated MSE prior to the combining step, because:

$$y_{c,s} = \frac{y_c}{MSE} = \frac{w^H y}{MSE} = \frac{w^H}{MSE} y.$$

In another alternate embodiment, if a decoder connected to the present invention requires the channel state information to be separate from the combined signal, the combined signal and the function of the estimated MSE are gathered as an ordered pair and are passed to the decoder as:

$(y_c, MSE)$

The following is an exemplary embodiment for a receiving unit with only one branch receiver. Because there is only one branch receiver, the equations are simplified, and this simplification provides additional understanding of the operation of the invention in the general case. In this example, the desired symbol is assumed to originate from transmitter "0" and both the desired and the interfering transmitters utilize phase shift keying with unit power constellations (although the invention may also be applied to other modulations and non-unit power constellations). The use of unit power constellations means that:

$E\{|x_0|^2\} = E\{|x_1|^2\} = 1.$

The received symbol at the branch receiver 102 is given as follows:

$y = g_{0,0} x_0 + g_{0,1} x_1 + n_0,$ yielding complex channel gains of $g_{0,0}$ and $g_{0,1}$ by the pilot symbol discriminator 130. The branch weights determiner computes the received symbol covariance matrix:

$\Phi = |g_{0,0}|^2 + |g_{1,0}|^2 + \sigma_0^2$ and an inverse covariance "matrix" or complex channel gain of:

$$\Phi^{-1} = \frac{1}{|g_{0,0}|^2 + |g_{1,0}|^2 + \sigma_0^2}$$

Using the above information, the branch weight is computed in the branch weights determiner 138 as:

$$w = \frac{g_{0,0}^*}{|g_{0,0}|^2 + |g_{1,0}|^2 + \sigma_0^2},$$

and the MSE is computed in the mean square error determiner 140 as:

$$MSE = 1 - \frac{|g_{0,0}|^2}{|g_{0,0}|^2 + |g_{1,0}|^2 + \sigma_0^2}.$$

For the single branch receiver, there is no combiner, so the division by the estimated MSE of the preferred embodiment may be applied directly to the branch weight, leading to:

$$\frac{w}{MSE} = \frac{g_{0,0}^*}{|g_{0,0}|^2 + |g_{1,0}|^2 + \sigma_0^2 - |g_{0,0}|^2}$$

$$= \frac{g_{0,0}^*}{|g_{1,0}|^2 + \sigma_0^2}.$$

In another alternate embodiment with multiple branch receivers, maximal ratio combining may be used in place of MMSE combining. In this case, the branch weights computed by the branch weights determiner 138 are used as the basis for a maximal ratio combining algorithm. The output of each branch receiver is weighted as if in were the only one in the array, using an equation similar to the one derived above for a single branch receiver.

The dual-antenna apparatus of FIG. 1 receives a received signal comprised of a desired signal (first transmitted signal 110) and an undesired signal (second transmitted signal 120) at each branch receiver in the current embodiment. In an alternate embodiment, both signals may be desired and each processed in accordance with the burst mode soft decision diversity combining approach herein disclosed. The current embodiment assumes the desired symbol is part of the first transmitted signal 110, which originates from a transmitter that is given a mathematical subscript of "0" in the following equations. (When a variable in an equation has two subscripts, the transmitter subscript is the first of the two subscripts.) When both the desired and the interfering transmitters utilize phase shift keying with unit power constellations, it is implied that:

$E\{|x_0|^2\} = E\{|x_1|^2\} = 1.$

The received symbol vector is given as:

$$\underline{y} = \begin{bmatrix} g_{0,0} \\ g_{0,1} \end{bmatrix} x_0 + \begin{bmatrix} g_{0,0} \\ g_{0,1} \end{bmatrix} x_1 + \begin{bmatrix} n_0 \\ n_1 \end{bmatrix},$$

yielding a received symbol covariance matrix:

$$\Phi = \begin{bmatrix} |g_{0,0}|^2 + |g_{1,1}|^2 + \sigma_0^2 & g_{0,0}^* g_{0,1} + g_{1,0} g_{1,1}^* \\ g_{0,1}^* g_{0,0} + g_{1,1}^* g_{1,0} & |g_{0,1}|^2 + |g_{1,1}|^2 + \sigma_0^2 \end{bmatrix}$$

and an inverse covariance matrix:

$$\Phi^{-1} = \frac{\begin{bmatrix} |g_{0,1}|^2 + |g_{1,1}|^2 + \sigma_1^2 & -g_{0,0}^*g_{0,1} - g_{1,0}^*g_{1,1}^* \\ g_{0,1}^*g_{0,0} + g_{1,1}^*g_{1,0} & |g_{0,0}|^2 + |g_{1,0}|^2 + \sigma_0^2 \end{bmatrix}}{\sigma_0^2\sigma_1^2 + \sigma_0^2(|g_{0,1}|^2 + |g_{1,1}|^2) + \sigma_1^2(|g_{0,0}|^2 + |g_{1,0}|^2) + |g_{0,0}g_{1,1} - g_{0,1}g_{1,0}|}$$

Using the above information, the branch weights are computed as:

$$\underline{w} = \begin{bmatrix} g_{0,0}^*(|g_{1,1}|^2 + \sigma_1^2) - g_{0,1}^*g_{1,0}^*g_{1,1} \\ g_{0,1}^*(|g_{1,0}|^2 + \sigma_0^2) - g_{0,0}^*g_{1,1}^*g_{1,0} \end{bmatrix},$$

and the MSE estimate is computed as:

$$MSE = \sigma_0^2\sigma_1^2 + \sigma_0^2|g_{1,1}|^2 + \sigma_1^2|g_{1,0}|^2.$$

It is appreciated by those skilled in the art that the method steps shown in FIG. 4 may be performed by hardware, software, or a combination of hardware and software. An embodiment of the method may employ one or more computer-readable signal bearing media (such as the internet, magnetic storage medium, such as floppy disks, or optical storage, such as compact disks(CD/DVD), biological, or atomic data storage medium). In another embodiment, the computer-readable signal-bearing medium may comprise a modulated carrier signal transmitted over a network comprising or coupled with a diversity receiver apparatus, for instance, one or more telephone networks, a local area network, the internet, and a wireless network. An exemplary component of such embodiments is a series of computer instructions written in or implemented in any number of programming languages.

The present invention is particularly useful in systems where channels are expected to have relatively slow, flat fading characteristics. With slow, flat fading, there is no significant inter-symbol interference (ISI) or change in the channel gain over the duration of a pilot code, and the orthogonality of pilot codes received from different transmitters is preserved after passing through the channel. An OFDM system satisfies the flat-fading criterion, even in frequency selective channels. Because an OFDM system divides the channel bandwidth into a large number of narrow sub-carriers, the channel appears to be flat-faded within a sub-carrier bandwidth, even if the channel has frequency selective fading. With an OFDM system, the benefit of flat fading is obtained even in channels with frequency selective fading. The invention also provides benefit in single-carrier systems with frequency-selective fading. Alternatively, the invention may be used following a channel equalizer in a single-carrier system. A channel equalizer reduces ISI and significantly reduces the apparent frequency selectivity of the channel.

When the length of the pilot code is at least as large as the number of significant co-channel signals and the pilot codes are mutually orthogonal, the receiver estimates the complex channel gain of each significant co-channel signal and uses this information to allow a short pilot code to be utilized in branch weight determination while eliminating co-channel interference on each vector channel response measurement, thereby enabling a more accurate covariance matrix estimation and branch weights determination.

The present invention is described above for the case where the channel response is modeled as a single complex channel gain. The present invention may also be applied to an alternate embodiment comprising a system that operates with a channel response comprising a channel impulse response that may be modeled as multiple complex channel gains at various arrival times spanning a time interval on the order of a symbol interval or greater. In this alternate embodiment, with a single carrier signal, the branch weight may be replaced with a filter or an equalizer having coefficients that provide reduction of inter-symbol-interference as well as serve the purpose of the branch weight. In addition, an estimate of the mean square error may be determined from the channel response and/or the coefficients of the filter or equalizer.

In an OFDM system or other systems employing frequency domain receiver processing, a channel response may be modeled as a single complex channel gain on each subcarrier, and the above description using a single complex channel gain may be applied to a subcarrier of an OFDM system even when the channel impulse response comprises multiple complex channel gains at various arrival times.

While the invention has been particularly shown and described with reference to a particular embodiment, it is understood by those skilled in the art that various changes in form and details may be made therein without departing from the spirit and scope of the invention and it is intended that all such changes come within the scope of the following claims.

What is claimed is:

1. A method comprising the steps of:
   receiving, by a first receiver, a first received signal comprising a first signal and a second signal;
   receiving, by a second receiver, a second received signal comprising the first signal and the second signal;
   determining at least one branch weight associated with the first receiver and at least one branch weight associated with the second receiver;
   combining the at least one branch weight associated with the first receiver, the at least one other branch weight associated with the second receiver, the first received signal, and the second received signal, forming a combined signal;
   determining channel state information for the combined signal; and
   restoring the channel state information of the combined signal;
   wherein the first signal comprises at least two different instances of a predetermined sequence, further comprising the step of determining variations channel response between the different instances of the predetermined sequence.

2. The method of claim 1, wherein the step of combining comprises the steps of:
   applying the at least one branch weight associated with the first receiver to the first received signal, forming a first weighted branch signal;
   applying the at least one branch weight associated with the second receiver to the second received signal, forming a second weighted branch signal; and
   combining the first weighted branch signal and the second weighted branch signal to form a combined signal.

3. The method of claim 1, wherein the steps of determining channel state information and restoring comprise the steps of:
   determining a mean square error estimate for the combined signal; and applying a function of the mean square error estimate to the combined signal.

4. The method of claim 3, wherein the step of applying the function of the mean square error estimate comprises dividing the combined signal by the mean square error estimate.

5. The method of claim 3, wherein the mean square error estimate, MSE, is based on processing at least one of a decision-directed error signal and a pilot symbol directed error signal over a plurality of symbol intervals.

6. The method of claim 1, wherein the step of restoring comprises outputting the combined signal and the channel state information as separate quantities.

7. The method of claim 1, wherein the first receiver is a branch receiver and the second receiver is a branch receiver.

8. The method of claim 1, wherein the first signal is transmitted by a first transmitter and the second signal is transmitted by a second transmitter.

9. The method of claim 1, wherein the step of determining further comprises the step of determining at least one channel response for the first signal and at least one channel response for the second signal.

10. The method of claim 9, wherein any channel response comprises a complex channel gain.

11. The method of claim 9, wherein any channel response comprises multiple complex channel gains at various times.

12. The method of claim 1, further comprising the step of identifying a predetermined sequence within the first signal.

13. The method of claim 12, wherein the predetermined sequence comprises a pilot code.

14. The method of claim 1, further comprising the step of identifying a predetermined sequence within the second signal.

15. The method of claim 14, wherein the predetermined sequence comprises a pilot code.

16. The method of clam 1, further comprising the step of utilizing pilot code from at least one of the first signal and the second signal to determine the at least one branch weight associated with the first receiver and the at least one branch weight associated with the second receiver.

17. The method of claim 1, wherein the first signal is a time division multiple access (TDMA) encoded signal and the second signal is another TDMA encoded signal.

18. The method of claim 1, wherein the first signal is an orthogonal frequency division multiplexed (OFDM) encoded signal and the second signal is another OFDM encoded signal.

19. The method of claim 1, wherein the method steps are implemented as computer readable program code within a computer-readable signal bearing medium.

20. An apparatus comprising:
 a receiver that receives a first received signal comprising a first signal and at least one other signal;
 at least one other receiver that receives one other received signal comprising the first signal and at least the one other signal;
 a branch weights determiner, operably coupled to the receiver and the at least one other receiver, that derives at least one branch weight associated with the first received signal and at least one other branch weight associated with the one other received signal;
 a signal combiner, operably coupled to the branch weights determiner, wherein the signal combiner combines the first received signal weighted by the at least one branch weight and the at least one other received signal weighted by the at least one other branch weight, yielding a combined signal;
 a mean square error estimate determiner, operably coupled to the branch weight determiner, that determines a mean square error for the combined signal; and
 a channel state information restorer, operably coupled to the signal combiner and the mean square error estimate determiner, that applies a function of the mean square error estimate to the combined signal to restore a soft decision component of the combined signal.

21. The apparatus of claim 20, further comprising a symbol discriminator, operably coupled to the branch weights determiner, that determines one or more channel responses associated with the first signal and one or mare channel responses associated with the at least one other signal.

22. The apparatus of claim 20, wherein any channel response comprises a complex channel gain.

23. The apparatus of claim 20, wherein any channel response comprises multiple complex channel gains at various times.

24. The apparatus of claim 20, wherein the first receiver is a branch receiver and the one other receiver is a branch receiver.

25. The apparatus of claim 20, wherein the first received signal is transmitted by a first transmitter and the one other signal is transmitted by a second transmitter.

26. The apparatus of claim 20, wherein the first signal comprises at least two different instances of a predetermined sequence, the apparatus further an determiner of variations in channel response between the different instances of the predetermined sequence.

27. The apparatus of claim 20, further comprising an identifier of a predetermined sequence within any of the first signal and the at least one other signal.

28. The apparatus of claim 27, wherein the predetermined sequence comprises a pilot code.

29. The apparatus of claim 20, wherein the branch weights determiner is arranged and constructed to utilize pilot code from at least one of the first signal and the one other signal to determine the at least one branch weight and the at least one other branch weight.

30. The apparatus of claim 20, wherein the first signal is a time division multiple access (TDMA) encoded signal.

31. The apparatus claim 20, wherein the first signal is an orthogonal frequency division multiplexing (OFDM) encoded signal.

32. The apparatus of claim 20, wherein the mean square error estimate, MSE, is based on processing at least one of a decision-directed error signal and a pilot symbol directed error signal over a plurality of symbol intervals.

33. The apparatus of claim 20, wherein the apparatus is comprised at least in part of a computer-readable signal bearing medium comprising computer readable program code.

* * * * *